Dec. 17, 1935.   A. A. ELIOPOULOS   2,024,849
CULINARY ARTICLE
Filed Aug. 4, 1933
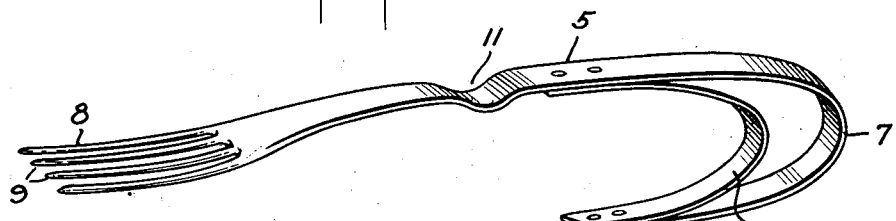
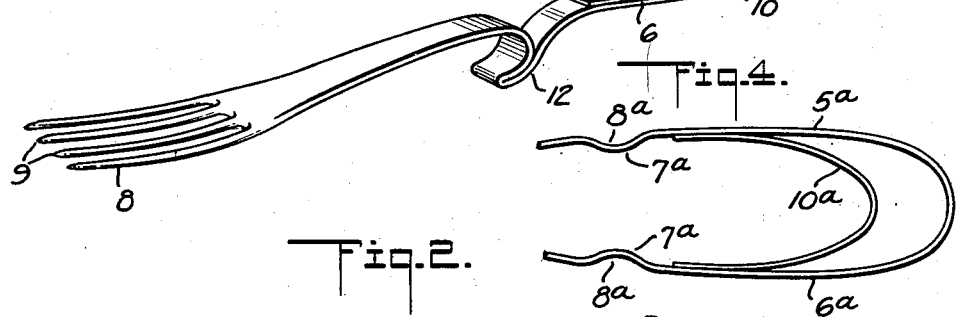
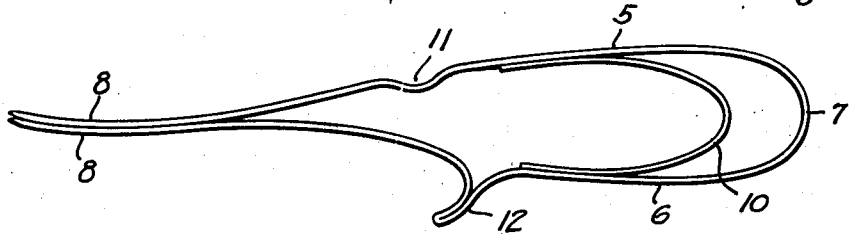
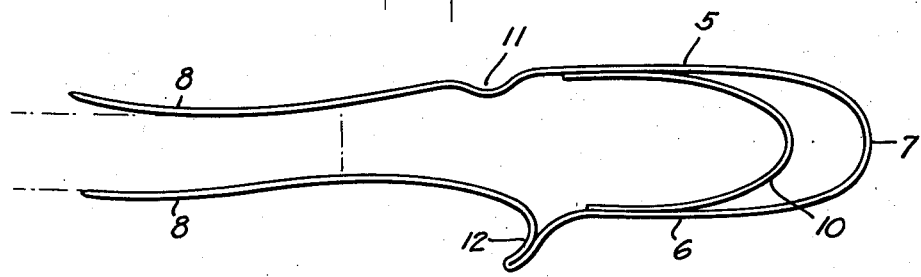
INVENTOR.
ALEXANDER A. ELIOPOULOS
BY
ATTORNEYS.

Patented Dec. 17, 1935

2,024,849

UNITED STATES PATENT OFFICE 2,024,849

CULINARY ARTICLE

Alexander A. Eliopoulos, Redlands, Calif.

Application August 4, 1933, Serial No. 683,703

1 Claim. (Cl. 294—99)

My invention relates to culinary articles and has for its object the provision of a highly novel and useful device of this character which is so designed and constructed that it may be effectively and conveniently employed to facilitate the handling of various articles of food, such as when it is desired to transfer the food from one dish, pan or the like to another.

Another object of the invention resides in the provision of means for gripping the food in a manner to prevent displacement thereof from the device during the handling thereof.

A still further object of the invention is to provide a device of the character mentioned wherein the gripping means employed may be satisfactorily employed in the handling of slices of pie, cake or other such articles of pastry.

To these ends my invention consists in certain novel features, which I will now proceed to describe and will then particularly point out in the claim.

In the accompanying drawing,

Figure 1 is a perspective view of the device;

Figure 2 is a view in side elevation, showing the parts adjusted for one particular use;

Figure 3 is a view similar to Figure 2 showing the parts adjusted to other relative positions to adapt the device to a different use;

Figure 4 is a view in side elevation of a portion of the device showing a slightly modified form of the invention.

In the accompanying drawing, I have shown a device embodying my invention in one form. In the illustrated embodiment, the device is shown as comprising two long, relatively movable handles 5 and 6, which are connected together by a loop 7 at the manipulating end of the device. It is preferred that the handles and said loop be constructed from a single piece of metal, such as steel, and that the forward or free extremity of each of said handles be formed substantially like an ordinary table fork, as will be fully appreciated on reference to Figure 1 of the drawing. These fork ends of the respective handles are specifically designated by the reference numerals 8, and each said end is provided with spaced-apart tines 9. These fork ends of the device are identical in every respect, and they are so arranged that when the handles are adjusted to the position shown in Figure 2, the fork end of the upper handle 5 will lie flatwise against the corresponding end of the lower handle. Because of this arrangement and construction of said fork ends, it follows that when said handles are adjusted to the position just stated, the device is adapted to be used in the manner of an ordinary fork. When the handles occupy the relative positions shown in Figure 3, they are readily effective for the purpose of positioning a slice of pie, cake or the like therebetween when it is desired to transfer same from one dish or pan to another.

Interposed between the handles 5 and 6 and connected therewith in any suitable well known manner is a leaf spring 10 by means of which the handles are normally urged to their fully opened positions with respect to each other, as will be understood upon reference to Figure 1 of the drawing. When the fork ends of the device are fully opened as just stated, the lower fork may be slidably inserted beneath the article to be lifted and transferred from one place to another, and when fully adjusted, as intended, the upper fork may be advanced downwardly against said article with sufficient force to securely confine the article in a fixed position during the handling thereof. By merely releasing the pressure of the fingers of the hand from the respective handles, the article being handled can be readily dissociated from the device, as will be understood.

In order that the device may be firmly gripped between the fingers of the hand of the user and the handles moved against the normal tendency of the spring 10, I provide a thumb receiving or accommodating dished or cupped portion 11 in the upper handle 5 and as concerns the lower handle 6, the metal from which it is formed is preferably upstruck on itself at 12 and suitably curved in a forward direction so that the index finger may be passed over and around same. The loop end 7 of the device can be conveniently accommodated in the palm of the hand so that the thumb and index fingers, respectively, can be readily engaged with the aforestated portions 11 and 12 and pressure of the thumb applied to the handle 5 to advance the fork end thereof towards the corresponding end of the handle 6.

The device is properly adapted to the uses above set forth, and in addition thereto is particularly useful in the handling of spaghetti, slaw, cabbage and other foods which cannot be satisfactorily handled with the aid of forks, spoons or other well known implements of the variety commonly found in the kitchen.

From the foregoing it is believed that my invention may be clearly understood without further description, it being borne in mind that numerous changes may be made in the details of construction without departing from the spirit of the invention as set forth in the hereto appended claim.

In the form of the invention shown in Figure 4, the handles 5a and 6a are provided with upset portions 7a, each presenting a finger-receiving depression 8a. The handles may be gripped in the hand in any manner most convenient to the user, and one finger can be accommodated in the depression 8a of the handle 6a and another in the depression of the handle 5a during the operation of moving said handles against the tension of the spring 10a. In other respects, this form of the device is the same as the one first above referred to.

What is claimed is:

In a device for lifting slices of pie or the like when transferring same from a pan to a serving plate, a single piece of flat resilient metal bent medially to provide a loop forming a handle portion and shanks extending from the loop in substantially parallel relation, the ends of the shanks having projecting tines disposed in parallel relation, one of the shanks intermediate the ends thereof having a cupped portion to receive the thumb of the operator, the other shank directly opposite the cupped portion having a portion of its length folded upon itself and curved forwardly to provide a support for the index finger of the operator, a spring member bent medially to form a loop having legs extending along the shanks terminating adjacent the cupped and folded portions of the shanks and secured to the respective shanks, the loops of the spring member being substantially concentric with the loops connecting the shanks, said spring member not only maintaining the shanks and tines in spaced parallel relation but reinforcing said shanks when connected to said shanks.

ALEXANDER A. ELIOPOULOS.